US006881237B2

(12) United States Patent
Storz et al.

(10) Patent No.: US 6,881,237 B2
(45) Date of Patent: Apr. 19, 2005

(54) AIR FILTER FOR AN INTERNAL COMBUSTION ENGINE

(75) Inventors: Eberhard Storz, Kirchheim (DE); Joerg Winkel, Weissach (DE)

(73) Assignee: Dr. Ing. h.c.F. Aktiengesellschaft, Stuttgart (DE)

( * ) Notice: Subject to any disclaimer, the term of this patent is extended or adjusted under 35 U.S.C. 154(b) by 76 days.

(21) Appl. No.: 10/396,715

(22) Filed: Mar. 26, 2003

(65) Prior Publication Data

US 2004/0011011 A1 Jan. 22, 2004

(30) Foreign Application Priority Data

Mar. 27, 2002 (DE) ........................................ 102 13 603
Feb. 1, 2003 (DE) ........................................ 103 04 028

(51) Int. Cl.[7] .......................... B01D 46/00; B01D 46/54

(52) U.S. Cl. .......................... 55/385.3; 55/410; 55/418; 55/419; 55/482; 55/484; 55/495; 55/503; 96/4; 96/380; 96/383; 96/384; 123/198 E

(58) Field of Search ............................... 55/385.3, 410, 55/418, 419, 482, 484, 495, 499, 503, DIG. 28; 96/4, 380, 383, 384, 388; 123/198 E

(56) References Cited

U.S. PATENT DOCUMENTS 3,487,624 A * 1/1970 Tignanelli .................... 55/482
4,083,184 A * 4/1978 Ushijima et al. .......... 55/385.3
4,134,263 A * 1/1979 Matsumoto et al. .......... 55/419
4,236,901 A * 12/1980 Kato et al. ................. 55/385.3
4,509,613 A * 4/1985 Yamaguchi ................ 55/385.3
5,400,753 A * 3/1995 Andress et al. ......... 123/198 E
6,009,846 A 1/2000 Walker, Jr.
6,261,333 B1 * 7/2001 Dickson .................... 55/385.3
6,565,620 B1 * 5/2003 Greeson .................... 55/385.3

FOREIGN PATENT DOCUMENTS

DE 19704376 A1 * 8/1998 .......... F02M/35/14
DE 19940610 A1 3/2001
EP 1111228 A2 6/2001
GB 909034 10/1962
JP 09032669 A 2/1997
JP 2002021660 A 1/2001

* cited by examiner

*Primary Examiner*—Duane Smith
*Assistant Examiner*—Jason M. Greene
(74) *Attorney, Agent, or Firm*—Crowell & Moring LLP

(57) ABSTRACT

An air filter housing for an internal combustion engine, which includes an unfiltered air capsule and a filtered air capsule, contains an orifice with perforations which are covered by air-permeable fabric or a sound element. Air-borne sound emission occurs through these orifices and through the fabric or the sound element in such a way as to optimize the exterior and interior sounds of the vehicle.

11 Claims, 2 Drawing Sheets

AIR FILTER FOR AN INTERNAL COMBUSTION ENGINE

This application claims the priority of German applications 102 13 603.3,filed Mar. 27, 2002, and 103 04 028.5, filed Feb. 1, 2003, the disclosures of which are expressly incorporated by reference herein.

BACKGROUND AND SUMMARY OF THE INVENTION

The present invention relates to an air filter arrangement for an internal combustion engine including a housing, in which an air filter element is arranged and which is located between an unfiltered air intake in an unfiltered air capsule and a filtered air outlet in a filtered air capsule, and a membrane which covers an orifice contained within the housing.

An air filter for an internal combustion engine in a vehicle, which is designed to transmit sound into the passenger compartment, is known from German publication DE 199 40 610 A1. To that end, a housing orifice is provided in the air filter housing through the use of an oscillating and airtight membrane. As the membrane is made of a material more permeable to sound than the housing wall, the shape and position of the membrane can be used to achieve specific sound generation and distribution.

One object of this invention is to design an air filter housing in such a way as to render it capable of having an acoustic effect on the exterior and interior sounds of vehicles and to enable integration of a sound device, by way of a simple mounting process, into the air filter housing.

This object is achieved according to the invention by providing an air-permeable and fine-mesh fabric or a thin-walled sound element covering a housing orifice with at least one perforation contained in the unfiltered air capsule or the filtered air capsule for airborne sound emission. Additional advantageous features are included in the dependent claims.

The invention advantageously enables sound components in the intake tract to be emitted via orifices in the air filter housing, which are covered by fabric or a thin-walled sound element, in such a way as to cause the vehicle to emit a pleasant exterior and interior sound. This is basically accomplished by equipping, for the purpose of airborne sound emission, the unfiltered air or filtered air capsule of the air filter housing with a housing orifice containing at least one perforation, which is covered by an air-permeable and fine-meshed structured fabric or thin-walled sound element. The fabric can be water-repellent or watertight. The perforations are preferably provided in an insert part, which is introduced into the housing orifice. The fabric or sound element can also be clamped between two perforated insert parts in the housing orifice, and the housing orifice is closed in an air-permeable manner. Furthermore, an embodiment in which the perforations are molded into the housing wall and are then covered by the fabric or the sound element is also conceivable.

A housing orifice with perforations, covered by fabric or by the sound element, advantageously enables, for example, the emission of sound components in the intake tract via the housing orifice. In particular, perforations that are adjusted to the desired interior and exterior sound can be arranged in the housing wall; that is, it is possible to arrange for a certain number of orifices or a certain geometrical shape, or even a certain diameter of the orifices.

In order to prevent the perforated insert parts with the fabric or sound element arranged between them from transmitting impact sounds made by the fabric or the sound element at the time of a sudden change in pressure, impact dampers can be provided on the insert parts. The fabric can also be glued onto the perforation.

The fabric used is a so-called industrial fabric, which can be made impermeable to water, rain and dirt, etc. This fabric is so finely meshed as to avoid the inconvenient intake of warm air from the engine compartment during a "warm start". The fabric allows only a small amount of flow during starting, idle and partial load of the internal combustion engine. During air circulation at higher rates, for example when the internal combustion engine is fully loaded, the fabric, as a function of its structure, can allow a greater portion of the intake air to pass through. This leads to a reduction in the pressure ratio of the intake system and can be used to increase the engine power. Due to the different rates of air intake in the various operating conditions of the motor, an advantageous separation between warm and cold intake air components is possible.

According to another embodiment of the invention, a wall containing a perforation is molded onto the housing wall forming the housing orifice, and the membrane formed of the fabric or the thin-walled sound element is arranged between this wall and an attached insert part containing perforations.

Furthermore, the membrane formed of the fabric or the sound element can be connected to a frame, which is arranged above or beneath a housing orifice and is connected to the housing.

Embodiments of the invention are shown in the drawings and are explained in greater detail below.

DETAILED DESCRIPTION OF THE DRAWINGS

Figure 1:
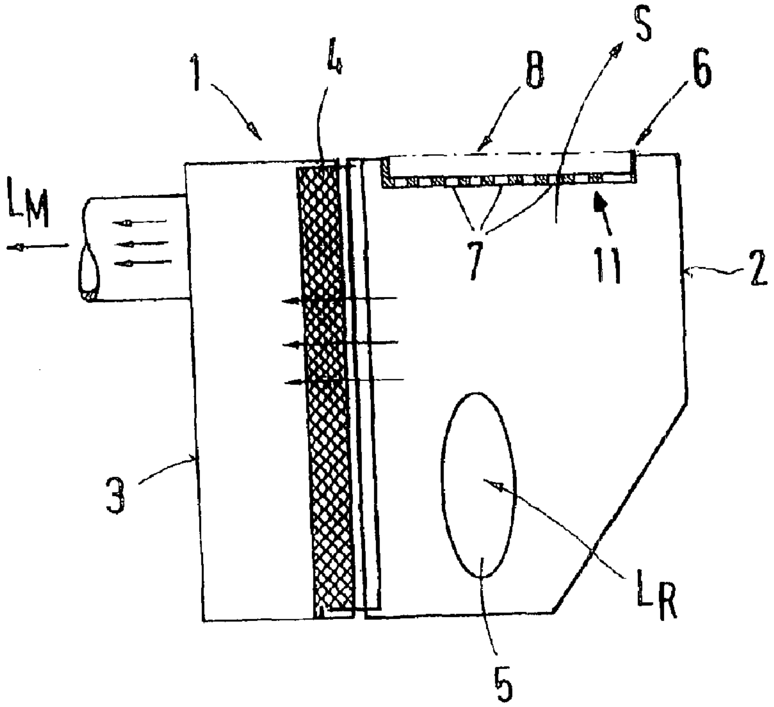
FIG. 1 is a schematic representation of an air filter housing with a perforated air orifice in an insert part and a covering made of industrial fabric or a sound element.

An air filter housing 1 for an internal combustion engine of a motor vehicle includes, at least, an unfiltered air capsule 2 and a filtered air capsule 3, which are tightly connected to each other. An air filter 4 is arranged between these two capsules 2 and 3. Unfiltered air LR is fed into the housing 1 via a snorkel 20 and/or via an orifice 5 in the unfiltered air capsule 2 and then through the air filter 4 into the filtered air capsule 3, from which the filtered air LM is fed to an engine via a feed line.

An air orifice 6, which contains perforations 7, is provided in the unfiltered air capsule 2 or in the filtered air capsule 3 of the air filter housing 1, for example on top of the housing or in a different area of the housing. The orifice is shown in the unfiltered air capsule 2 by way of example only; it can also be provided in the filtered air capsule 3.

The outside of these perforations 7 is covered with industrial fabric 8, which has a fine mesh design and is sealed against water, dirt, rain and the like. A thin-walled sound element, which exhibits the same properties as those of a fabric, can also be used. By contrast, air can be taken in from the outside, and sound components S can be emitted in the intake tract through the housing in such a way as to enable regulation of the exterior and interior sound. The same also applies to the filtered air capsule 3. The fabric or the sound element can be arranged so as to vibrate.

Figure 2:
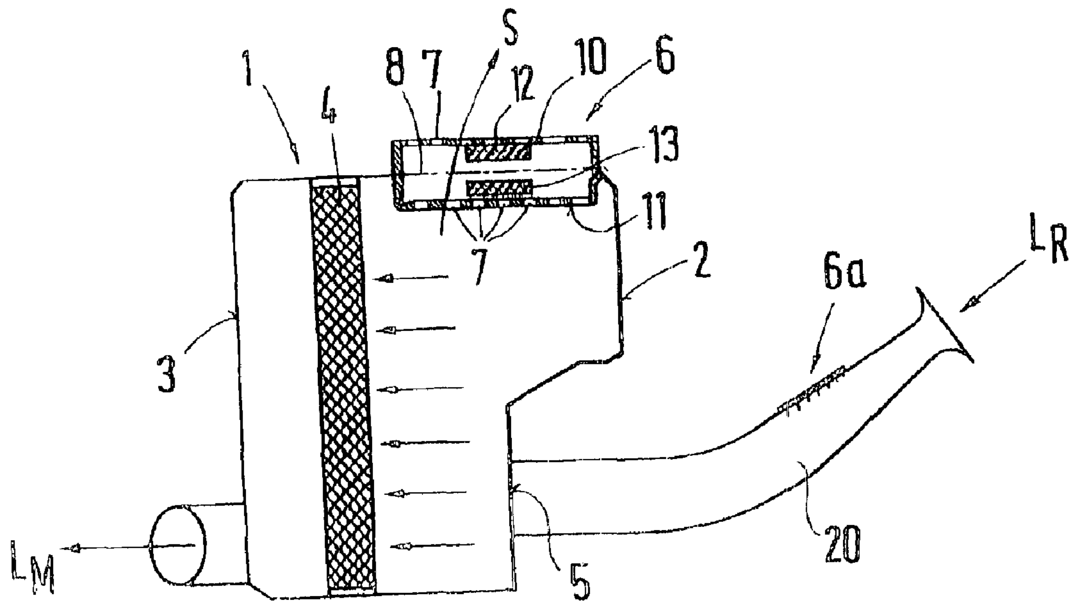
FIG. 2 shows another embodiment with industrial fabric or a sound element arranged between two perforated insert parts.

In a first embodiment according to FIG. 1, the orifice 6 in the unfiltered air capsule 2 of the housing 1 contains perforations in an insert part 11, which is equipped with holes of a certain number, shape and diameter that are covered by the industrial fabric 8 or the sound element. The insert part 11 can be shaped and/or molded into the housing wall, or implemented as an attachable separate component. In another embodiment according to FIG. 2, the industrial fabric 8 or the sound element is arranged in the unfiltered air capsule 2 between two insert parts 10 and 11 that are provided with perforations 7.

The insert parts 10 and 11 are connected to impact dampers 12, 13, which face each other on the inside and are distanced from or adjacent to each other, and between which the industrial fabric 8 or the sound element is arranged. These impact dampers 12, 13 preferably consist of a damping material such as foam so that, should any sudden changes in pressure take place, no undesirable sound, such as a so-called "plop", can arise.

The industrial fabric 8 or the sound element can exhibit such a structure that, at times when the air circulates at low rates, as is the case during starting, idle and partial load of the motor, only a small amount of air flow is let through; by contrast, when the air circulates at higher rates, such as under full load, a larger portion of the intake air is let through.

By designing the unfiltered air capsule 2 with the air orifice 6, a certain acoustic effect is achieved, through sound emission, in order to optimize the exterior and interior sounds of the vehicle.

The unfiltered air capsule 2 can be equipped with a so-called air snorkel 20 by providing an orifice 6*a* with perforations instead of or in combination with the air orifice 6. The orifice is then suitably covered with the industrial fabric 8 or the sound element, so that sound emission is possible from this area as well. Furthermore, the orifice 6 can also be arranged laterally to, or in a different area of, the unfiltered air or filtered air capsule 2 or 3.

The perforations 7 can also be molded into the housing wall of the unfiltered air capsule 2 and then covered by the fabric 8 or the sound element. The orifice 6 with the perforations 7 and the fabric 8 or the sound element can be arranged in any area of the air ducts to the motor.

Figure 3:
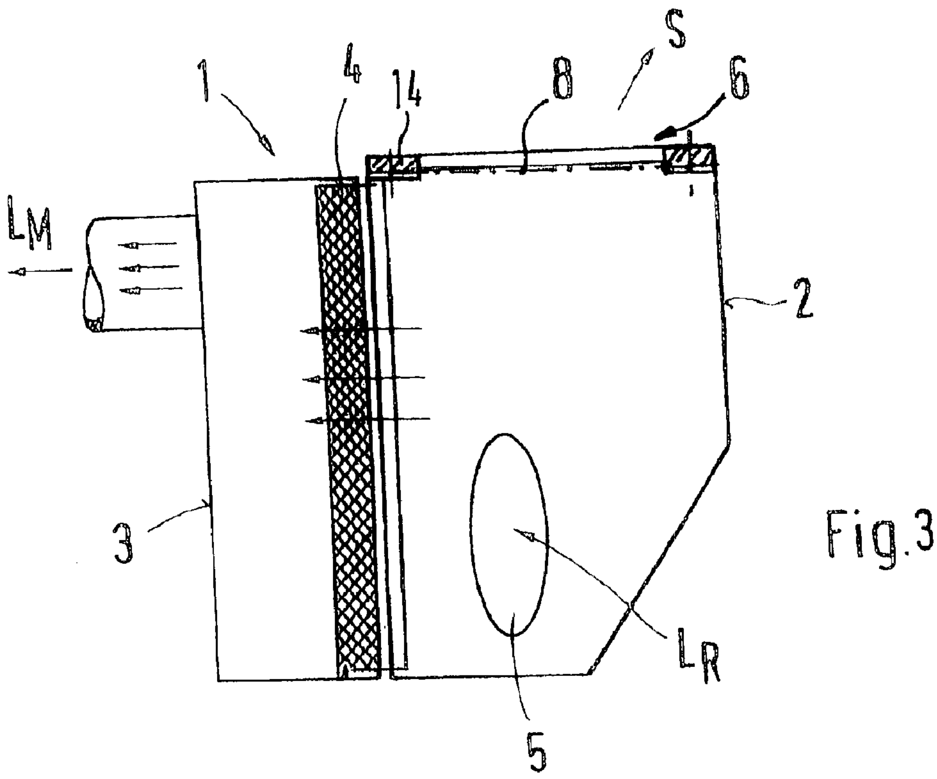
FIG. 3 shows another embodiment in a sectional view of a fabric or sound element that is connected to a frame.

According to another embodiment as shown in FIG. 3, the industrial fabric 8 or the similarly acting sound element can be attached to a frame 14, which is connected to the unfiltered air capsule 2 of the housing 1 and covers the air orifice 6 in the housing 1. This frame 14 can also cover an orifice in the filtered air capsule 3.

Figure 4:
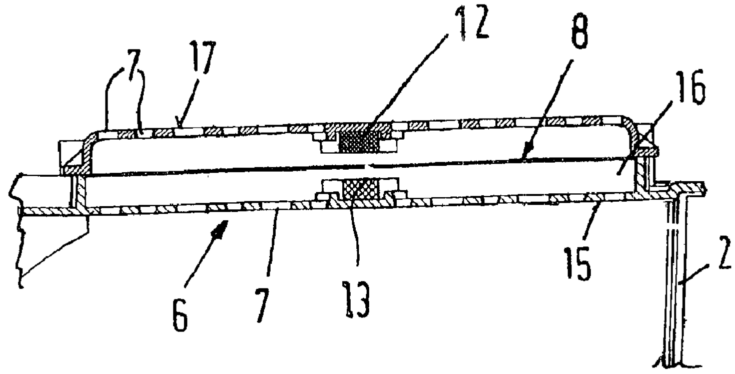
FIG. 4 shows another embodiment in a sectional view, whereby the fabric or the sound element is connected to an attached capsule.
Figure 5:
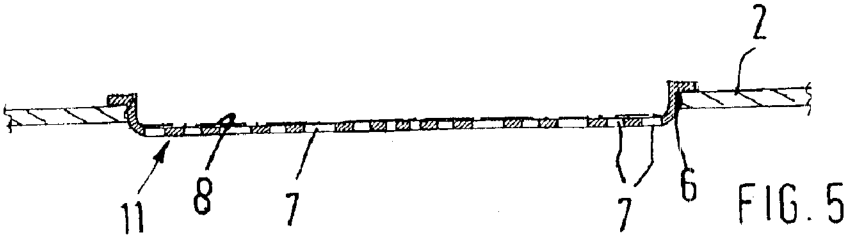
FIG. 5 shows another embodiment in a sectional view, whereby the fabric or the sound element is directly connected to the capsule.

According to another embodiment shown in FIG. 4, the orifice 6 in the unfiltered air capsule 2 is connected to a housing wall 15 containing perforations 7; a conduit 16 that is covered by the fabric 8 or the sound element joins the wall. An outward cover is formed by a capsule 17, which also contains perforations 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission, wherein the membrane is defined by at least one of an air-permeable and fine-mesh fabric and a thin-walled sound element with at least one perforation covering the housing orifice, wherein the fabric or the sound element is clamped between two perforated insert parts that have been inserted into the housing orifice, and wherein the housing orifice can be closed in an air-permeable manner.

2. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission.

wherein the membrane is defined by at least one of an air-permeable and fine-mesh fabric and a thin-walled sound element with at least one perforation covering the housing orifice, wherein the housing includes a wall containing a perforation that forms the housing orifice, and wherein the membrane is a fabric arranged between said wall containing the perforation that forms the housing orifice and an attached insert part containing perforations.

3. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission, wherein the membrane is defined by at least one of an air-permeable and fine-mesh fabric and a thin-walled sound element with at least one perforation covering the housing orifice, wherein an orifice is provided in an air snorkel of the unfiltered air capsule, and wherein said orifice provided in the air snorkel is covered by the fabric or the sound element.

4. An air filter arrangement for an internal combustion engine comprising:

a housing in which an air filter element is arranged and which is located between an unfiltered air intake in an unfiltered air capsule and a filtered air outlet in a filtered air capsule, and a housing orifice, which contains at least one perforation that is covered by an air-permeable and fine-mesh fabric or a thin-walled sound element, provided in the air filter housing for airborne sound emission, wherein an orifice containing a perforation with a fabric or sound element cover for airborne sound emission purposes is arranged in at least one area of an air duct from a snorkel to a throttle valve of the motor.

5. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission, wherein the membrane is defined by at least one of an air-permeable and fine-mesh fabric and a thin-walled sound element with at least one perforation covering the housing orifice, wherein the at least one perforation is provided in at least one insert part which is inserted and held in the housing orifice, wherein the fabric or the sound element is clamped between two perforated insert parts that have been inserted into the housing orifice, and wherein the housing orifice can be closed in an air-permeable manner.

6. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission, wherein the membrane is defined by at least one of an air-permeable and fine-mesh fabric and a thin-walled sound element with at least one perforation covering the housing orifice, wherein the at least one perforation is provided in at least one insert part which is inserted and held in the housing orifice, wherein the at least one insert part is inserted into a housing wall of the unfiltered air capsule or the filtered air capsule, wherein the fabric or the sound element is clamped between two perforated insert parts that have been inserted into the housing orifice, and wherein the housing orifice can be closed in an air-permeable manner.

7. The air filter arrangement according to claim 1, 5, or 6 wherein the insert parts contain opposing impact dampers and wherein the at least one of the fabric and the sound element is arranged between the impact dampers.

8. The air filter arrangement according to claim 7, wherein the impact dampers are made of damping material.

9. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission, wherein the membrane is defined by at least one of an air-permeable and fine-mesh fabric and a thin-walled sound element with at least one perforation covering the housing orifice, wherein the at least one perforation is provided in at least one insert part which is inserted and held in the housing orifice, wherein the housing includes a wall containing a perforation that forms the housing orifice, and wherein the membrane is a fabric arranged between said wall containing the perforation that forms the housing orifice and an attached insert part containing perforations.

10. An air filter arrangement for an internal combustion engine comprising:

a housing in which an air filter element is arranged and which is located between an unfiltered air intake in an unfiltered air capsule and a filtered air outlet in a filtered air capsule, and a membrane which covers a housing orifice provided in the unfiltered air capsule or the filtered air capsule for airborne sound transmission, wherein the membrane is defined by at least one of an air-permeable and fine-mesh fabric and a thin-walled sound element with at least one perforation covering the housing orifice, wherein the at least one perforation is provided in at least one insert part which is inserted and held in the housing orifice, wherein the at least one insert part is inserted into a housing wall of the unfiltered air capsule or the filtered air capsule, wherein the housing includes a wall containing a perforation that forms the housing orifice, and wherein the membrane is a fabric arranged between said wall containing the perforation that forms the housing orifice and an attached insert part containing perforations.

11. An air filter arrangement for an internal combustion engine comprising:

a housing in which an air filter element is arranged and which is located between an unfiltered air intake in an unfiltered air capsule and a filtered air outlet in a filtered air capsule, a housing orifice, which is covered by an air-permeable and fine-mesh fabric or a thin-walled sound element containing at least one perforation, provided in the housing for airborne sound emission, and a snorkel including a snorkel orifice containing a fabric or sound element cover with a perforation for airborne sound emission purposes arranged so as to lead to the housing.

* * * * *